United States Patent Office 3,421,179
Patented Jan. 14, 1969

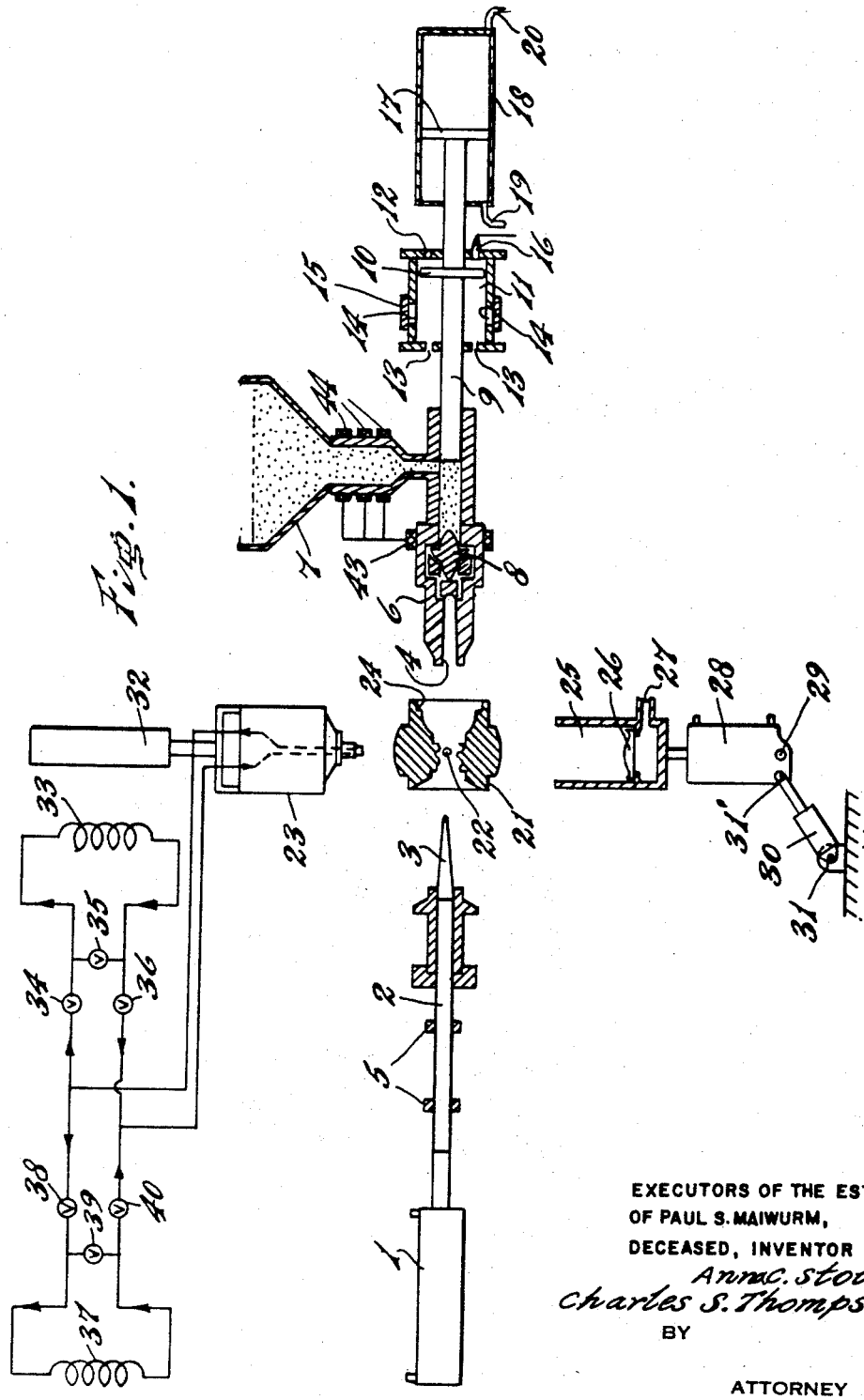

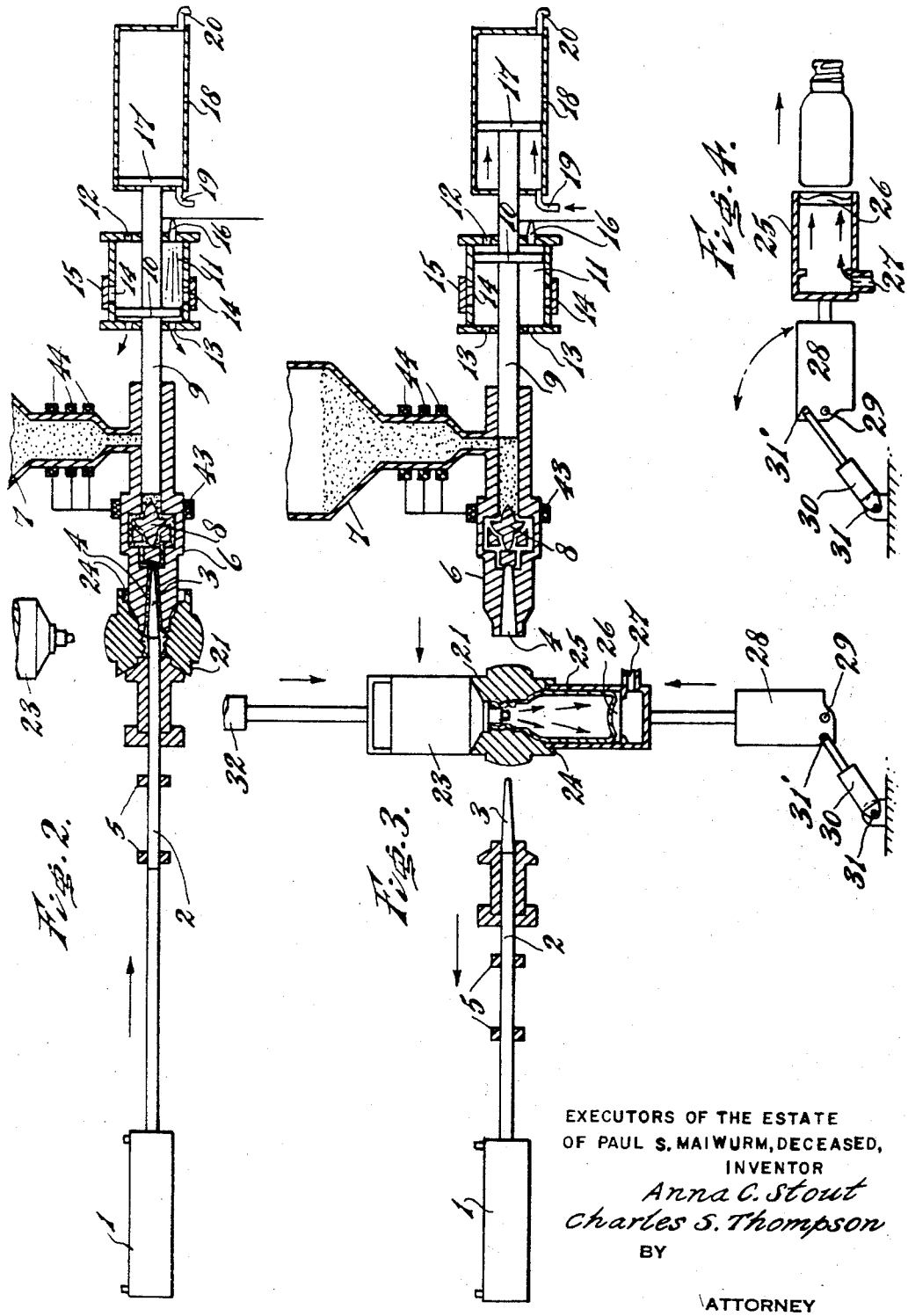

3,421,179
MACHINE FOR MAKING PLASTIC CONTAINERS
Paul S. Maiwurm, deceased, late of Pennsburg, Pa., by Anna C. Stout, Finland Village, Pennsburg, Pa. 18073, and Charles S. Thompson, 700 S. Washington Square, Philadelphia, Pa. 19106, executors
Filed Apr. 7, 1966, Ser. No. 547,123
U.S. Cl. 18—5     2 Claims
Int. Cl. B29c *1/14;* B29f *1/04;* B29f *3/06*

ABSTRACT OF THE DISCLOSURE

In this disclosure a machine has been devised for making plastic containers, having a mold, a closed cylinder, a ram in the cylinder, means to create an explosive charge acting on the ram to inject the plastic material into the mold to form a parison, means to circulate a heated fluid in the parison and means thereafter to circulate a cooling medium in the parison.

The use of an explosive charge provides a substantially instantaneous impact on the ram and thereby on the plastic material. This results in a reduction in the cost of manufacture, an increase in the number of articles made in a given time and a stronger and more homogenous structure of the article.

---

The objects of this invention are to obtain certain novel and useful improvements in the art of blow molding to produce bottles, and other objects constructed from materials principally known as plastic polymers. The novel processes result not only in better articles but also a higher production rate and therefore lower cost of operation.

By means of this invention, the recently improved plastic polymers can be used so as to take full advantage of their new physical and chemical characteristics to produce plastic blown articles competitive with glass and other materials now in common use.

The invention includes, as one element, a means of driving a piston by fluid pressures in excess of pressures normally and economically created by pumped systems, or pressure accumulator systems, which for this service, are normally substantially below 5,000 p.s.i.g.

Pistons driven by fluids which are pumped, or which come from a pressurized source external to the cylinder, move at a rate dependent on the conductance of the connecting means between the pressure source and the cylinder.

Only by rapid generation of pressure within the cylinder can maximum rate of application of force on the piston be achieved and be maintained as the piston moves in the cylinder.

The generation of such fluid pressure within the cylinder can be achieved, as one means by an explosion or rapid burning of fuels. By means of this sudden and sustained high pressure imparted to the piston, and through the piston to the fluid plastic material, certain novel and unexpected results are obtained.

The plastic material, under the resulting sustained high pressure, flows at high velocity through a circuitous path toward the parison mold. The high speed and high pressure of the plastic material results in a turbulence which affects the degree of molecular interaction of the plastics material molecules to cause a physical interlocking of the molecules.

This interlocking characteristic is retained as the parison is formed and as the parison is subsequently blown into the finished article.

The resulting article, containing the mechanically modified molecular configurations, has physical properties which differ substantially from similarly shaped articles, produced by conventional blow molding techniques but with the more conventional lower fluid pressures driving the pistons which forms the parison.

The articles formed by the higher pressure techniques have greater strength as exhibited by various tests, including impact and tear tests.

Such characteristics are of importance in, as an example, reducing the danger of rupture of tearing of the article during its end use or in handling, as, for example, in the case of containers for liquids.

Another feature of this invention is the method of attaining improved articles and more economical production by regulating the temperature and pressure of the blowing medium during blowing and during cooling.

The blowing fluid at a controlled temperature and pressure, is injected into the parison through a tube or opening in the parison. It circulates through the interior of the parison as it is being blown and passed through a restricted outlet back to an external reservoir of thermostatically controlled fluid. The blowing fluid temperature is controlled to avoid substantial cooling of the plastic material and in some cases to add heat to the material as the parison expands to the shape of the finished article. The circulation of blowing medium into and out of the article during blowing assures more uniform wall temperatures even though some portions of the blown article come in contact with the mold walls and tend thus to be cooled or heated below or above the desired plastic temperature.

By this means, the plastic material is maintained in the desired plastic condition, thus minimizing stresses created by the change in shape and resulting in more nearly uniform wall thickness and strength.

When the container has reached its desired final shape, it must be cooled rapidly to maximize the mold production rate, and to provide an improved strength through grain structure of the plastic. The cooling is accomplished by recirculating a cooling fluid controlled as to temperature, into and out of the article being blown as described above for the blowing medium. The cooled fluid is recirculated through a cooler and passed again into the article. This combination of controlled heating and controlled rapid cooling provides optimum production conditions and results in superior blow molded articles.

With the above and other objects in view, my invention consists of the hereafter described novel machine related to processing to take full advantage of all physical and chemical characteristics which are not available in the plastic polymers now available.

The present art of making plastic containers comprises one of three preliminary steps prior to the blowing of a plastic polymer in a desired shape or form.

In making plastic articles, the manufacturer has the choice of using either extrusion, injection or compression to produce a preform, known as a parison in the trade. This parison is then subjected to a blowing force to shape it as desired. Neither the extrusion, injection, or compression preforms, lend themselves ideally to take advantage of certain basic characteristics of the newest plastic polymers. Therefore, I propose the use of the equivalent of an explosive force in this invention, for example, the igniting of a mixture of acetylene and oxygen, not only to obtain higher production speeds, but also to gain greater strength in the molded article to compete with bottles and containers made from other than plastic polymers, such as polyethylene.

In the accompanying drawings, I have shown schematically, one form of structure for carrying out in practice, my novel invention.

FIGURE 1 is a schematic view showing the parts in position for the start of the cycle.

FIGURE 2 is a schematic view showing the parison being formed, with the piston in its advanced position.

FIGURE 3 is a schematic view showing the blowing mechanism in position, and bottom mold in position for the blowing operation, the parison molds being retracted.

FIGURE 4 is a schematic view showing the bottom mold in its retracted and inverted position with the article being ejected.

Similar numerals of reference indicate corresponding parts.

Referring to the drawings:

A cylinder 1, having a piston, not shown, and suitable fluid means to operate said piston and having an inlet and exhaust, is provided with a ram 2, which at its forward end has fixed to it in any suitable manner a male parison mold 3. The ram 2 is supported and guided by journals 5. A female parison mold cavity 4 is mounted in line with the male mold 3, cavity 4 being provided with a mold body 6. The mold body 6 is in fixed position and at its rearward end supports a hopper or container 7 to receive the plastic material in any suitable form. The mold body 6 at its forward end and communicating with the female mold cavity 4, is provided with channels 8 to force the raw plastic material to travel in a circuitous path before it enters the cavity 4 and at 8' as better shown in FIGURE 1. The body 6 at one end is adapted to receive a ram 9 provided with a piston 10, fixed to the ram. The piston 10 is also provided with an explosion chamber 11 having in its rearward end wall, an inlet port 12 for the admission of the explosive mixture and at its forward end wall relief ports 13. The body of the chamber 11 is also provided with relief ports 14 in the form of slots and having movable means in the form of a sleeve 15 to vary the amount of opening in the slots in order to scavenge the exhaust gases more or less as desired.

At its extreme rearward end the chamber 11 is also provided with ignition means 16, for the explosive mixture.

The explosive mixture, such as oxygen and acetylene, is introduced between the piston 10 and the rearward wall of cylinder 11. The explosive mixture is then ignited, driving piston 10 and ram 9 toward the mold, thus forcing the plastic material into the mold.

The ram 9 is provided with a piston 17, having a piston chamber 18 and ports 19 and 20 serving alternately as inlet and exhaust ports. This assembly serves to position the piston 10.

A mold body 21, centrally located between the parison molds 3 and 6, is pivotally mounted at 22 in its carriage which is adapted to be moved into position, and is also adapted to receive at its upper end the combination inlet and outlet blowing nozzle assembly 23. At its lower end as at 24, it is adapted to receive the lower mold body 25. The mold 25 at its lower end has a movable bottom portion 26 adapted to be moved outwardly by fluid means introduced through port 27. The mold 25 is moved into and out of position vertically by operating cylinder 28. Cylinder 28 is pivoted at 29 and tilted into ejecting position by cylinder 30 pivoted at 31 and exerting a force at pivot point 31' and cylinder 28.

The combination inlet and outlet blowing nozzle assembly 23 is also moved into and out of position by fluid cylinder 32. The assembly 23 is fed alternately with heated or cooled blowing medium by means of a heater and a cooler 33 having solenoid valves 34, 35, 36, 38, 39 and 40.

For certain plastic polymers, the parison mold 6 may be provided with heaters 43, and in like manner, the container 7 may be provided with heaters 44. Too control the temperature suitable thermocouples are also located on the structure so that the plasticizing heat can be controlled.

The object of the separate mold parts moving independently of each other is to make possible the forming of both the parison and the bottle as a seamless structure and further enables the production of the blown articles from injection of the parison to the final bottle blowing without separate handling. This produces a bottle or container which requires no further trimming or finishing and is complete when ejected from the mold.

The first and most important consideration of containers, particularly when used for fluids, is the strength of the container. One object of this invention is to develop and attain the highest physical properties and uniformity in such containers. The blowing or expanding medium, usually compressed air, is applied to extend to plastic polymer parison to fill the mold cavity. An essentially uniform temperature is obviously desirable during the blowing to maintain plasticity. In normal blowing techniques, the temperature of the blowing medium is below the optimum temperature, and therefore absorbs from the plastic mass continuously the stored heat therein. The plastic mass therefore loses its plasticity continuously during its expanding action until the container or mold confinement is reached. Since the plasticity differential in some plastic polymers may be narrow or varying as high as 100° F. between solidity and the final fluidity, it is necessary to use an intermediate temperature as the most appropriate temperature during the entire process of expansion of the plastic polymer used.

Now, however, there remains to be performed a cooling section so that the already blown container can be quickly removed or released from its confinement of the mold walls. For this purpose then a secondary action of cooling begins but this time circulating a controlled temperature cooling medium with all the physical actions repeated in the same manner as took place during the expanding function of the blowing and now serving the purpose of rapidly removing the heat stored in the walls of said container. This produces a container which through the shrinking action of the polymer permits a ready liberation of the finished container from the interior mold surface. Further beneficial effect is also obtained when certain newer type plastic polymers are used which benefit the polymer structure by producing greater strength and container wall clarity. This permits, through the natural shrinking action of the cooling, the removal of the completed container by use of a seamless tubular mold body which can readily be achieved through removal of the bottom section of said mold to permit passage and release from the mold cavity through the end opposite from the end of said blown container.

The entire aforesaid description of the blowing process becomes, however, dependent on a means of providing a pressurized expanding medium of controlled heat and controlled low temperature to make the cycling time productive. To shorten the blowing and cooling times so that the total output per blow mold can be markedly increased, an important consideration now becomes the temperature of the heated blowing medium and the temperature of the cooling medium. The critical temperature selected for blowing depends on the type of polymer selected for various uses and operation. This must be variable to a heat temperature from at least 150° F. to 400° F., or more according to type and for each polymer material the proper temperature must be determined and made available to achieve optimum results. Similarly, the optimum cooling medium temperature must be determined. Therefore, as a prime source, a sufficient supply of air or other fluid medium must be available for continuous operation depending again on the plastic type material selected. The prime pressurized supply will have to be kept in the range up to pressure of the order of 125 lbs. per square inch and must have ample storage capacity to obtain a non-pulsating supply stream. Care must be taken to keep the supply stream free from moisture and oil vapor.

It is to be noted that the heating medium is introduced centrally into the parison, circulates around the inner walls of the parison and passes outwardly off center from the points of admission to the parison.

It will be understood from the foregoing that the steps of the operation include the feeding of fluid plastic material into a confined space by means of an explosive charge or its equivalent, to form a parison; the circulation of a heated fluid into and out of the parison to expand it into container formation and refine and strengthen the walls of the container; and the circulation of cooling fluid into and out of the container at a predetermined pressure, to shrink the walls thereof, and facilitate the removal of the container from said space.

We are aware that it has been heretofore proposed in Patent 2,011,144, of Aug. 13, 1935 to Coffman, to employ the firing of a cartridge similar to a shotgun shell to propel a ram to move a lever to actuate a circuit breaker. This patent discloses no conception of the employment of the ram to feed a fluid plastic material in a straight or circuitous path into a parison mold to form a parison in the manner herein set forth.

Having thus described my invention, what I claim as new and desire to secure by Letters Patent is:

1. A machine for making plastic containers comprising a mold, a closed cylinder, a ram in the cylinder, means to feed heated plastic material into the cylinder, means to create an explosive charge acting on the ram to inject the plastic material into the mold to form a parison, means to circulate a heated fluid in the parison and means thereafter to circulate a cooling medium in the parison.

2. In a machine for making plastic articles, a closed cylinder, a ram in the cylinder, means to feed plastic material into the cylinder, a mold, and means to create an explosive charge to cause the ram to inject a plastic material into the mold.

References Cited

UNITED STATES PATENTS

| 3,004,290 | 10/1961 | Toulmin | 18—30 |
| 3,016,669 | 1/1962 | Grosclaude | 18—5 |
| 3,170,970 | 2/1965 | Adams | 18—5 |
| 3,170,971 | 2/1965 | Ninneman et al. | 18—5 |
| 3,289,248 | 12/1966 | Scott et al. | 18—5 |

WILBUR L. McBAY, *Primary Examiner.*

U.S. Cl. X.R.

18—12, 30; 264—84, 97